United States Patent
Park et al.

(10) Patent No.: US 11,162,158 B2
(45) Date of Patent: Nov. 2, 2021

(54) METHODS AND SYSTEMS FOR RECOVERING PRODUCTS FROM IRON AND STEEL SLAG

(71) Applicant: THE TRUSTEES OF COLUMBIA UNIVERSITY IN THE CITY OF NEW YORK, New York, NY (US)

(72) Inventors: Ah-Hyung Alissa Park, New York, NY (US); Xiaozhou Zhou, New York, NY (US)

(*) Notice: Subject to any disclaimer, the term of this patent is extended or adjusted under 35 U.S.C. 154(b) by 698 days.

(21) Appl. No.: 15/759,938

(22) PCT Filed: Sep. 19, 2016

(86) PCT No.: PCT/US2016/052537
§ 371 (c)(1),
(2) Date: Mar. 14, 2018

(87) PCT Pub. No.: WO2017/049311
PCT Pub. Date: Mar. 23, 2017

(65) Prior Publication Data
US 2018/0245182 A1    Aug. 30, 2018

Related U.S. Application Data

(60) Provisional application No. 62/220,690, filed on Sep. 18, 2015.

(51) Int. Cl.
C22B 59/00    (2006.01)
C22B 7/04    (2006.01)
(Continued)

(52) U.S. Cl.
CPC ............... *C22B 59/00* (2013.01); *B03C 1/02* (2013.01); *C21B 3/08* (2013.01); *C22B 1/248* (2013.01);
(Continued)

(58) Field of Classification Search
CPC .......... C22B 59/00; C22B 1/248; C21B 3/08; B03C 1/02; B03C 2201/20; C25B 1/16;
(Continued)

(56) References Cited

U.S. PATENT DOCUMENTS 3,740,199 A    6/1973    Gammill
8,534,578 B2    9/2013    Ki
(Continued)

FOREIGN PATENT DOCUMENTS

EP    2444507    3/2015
WO    2010034085    4/2010

OTHER PUBLICATIONS

Written Opinion of the International Search Authority from International Application No. PCT/US2016/052537, dated Feb. 17, 2017.

*Primary Examiner* — Arun S Phasge
(74) *Attorney, Agent, or Firm* — Bayramoglu Law Offices LLC

(57) ABSTRACT

Systems and methods for processing slag produced by iron and steel making processes are disclosed. The slag is treated produce a series of valued industrial products, such as metal oxides, metal carbonates, rare-earth metals, and water glass. The systems and methods also integrate slag processing with $CO_2$ sequestration and flue gas desulphurization. Processing slag minimizes the land use for stockpiling or landfilling wastes produced from iron and steel making processes and protects the ground water underneath. Overall, the solid and gaseous emissions of an energy-intensive and highly polluted industrial process have been largely reduced, recycled and valorized in order to achieve a near zero-emission goal.

15 Claims, 19 Drawing Sheets

(51) Int. Cl.
  *C21B 3/08*    (2006.01)
  *B03C 1/02*    (2006.01)
  *C22B 1/248*   (2006.01)
  *C25B 1/16*    (2006.01)
  *C25B 1/26*    (2006.01)

(52) U.S. Cl.
  CPC ............... *C22B 7/04* (2013.01); *C25B 1/16* (2013.01); *C25B 1/26* (2013.01); *B03C 2201/20* (2013.01); *Y02P 10/20* (2015.11); *Y02P 20/20* (2015.11)

(58) Field of Classification Search
  CPC ... C25B 1/26; C25B 7/04; Y02P 10/20; Y02P 20/20; Y02P 10/122
  See application file for complete search history.

(56) References Cited

U.S. PATENT DOCUMENTS

| | | | |
|---|---|---|---|
| 2004/0228783 A1* | 11/2004 | Harris | C22B 3/44 423/140 |
| 2012/0148461 A1 | 6/2012 | Rosenberg | |
| 2014/0134084 A1 | 5/2014 | Komon | |
| 2014/0373683 A1 | 12/2014 | Boudreault | |

\* cited by examiner

METHODS AND SYSTEMS FOR RECOVERING PRODUCTS FROM IRON AND STEEL SLAG

CROSS REFERENCE TO RELATED APPLICATION(S)

This application is a national stage filing of International Patent Application No. PCT/US2016/052537, filed Sep. 19, 2016, which claims the benefit of U.S. Provisional Application No. 62/220,690, filed Sep. 18, 2015, which are incorporated by reference as if disclosed herein in their entirety.

BACKGROUND

Iron and steel slag is a byproduct/waste material in the iron and steel making process, and its underutilization can lead to pollution and other environmental concerns. Typical slag comprises large amount of calcium, magnesium, silicon, iron, and aluminum in different chemical compositions. Slag can also comprise various types of rare-earth elements.

Unutilized slag is often stockpiled in storage yards or landfilled, and it can be a source of pollution and other environmental concerns. Additionally, high iron content, as high as 30-40 weight percent in the form of iron oxides, as well as various kinds of rare-earth elements often present in the slag depending on the sources of iron ore, iron and steel scrap and coal. Improved utilization of such waste material not only protects the environment, but also enables recycle and reuse of unconventional resources derived from waste.

While the current utilization of slag in developed countries often approaches 100%, as recent as 2012, the current utilization rate of slag was estimated to be only 22% in China and less in many other countries. In China alone, the amount of slag stored is estimated to be about 30 million metric tons, which occupies land and typically pollutes the environment. Improving processes to utilize slag is important to increasing the efficiency of companies utilizing slag in developed countries and increasing the utilization of slag in developing countries. For example, even in countries where the utilization rate of slag is high, slag is limitedly used as feedstock for cement, road base, aggregate and other low-value materials. Development of new processes to convert slag into high value materials would maximize the economic values of slag and decrease other natural resources extraction in order to minimize the environmental impact.

What is desired, therefore, is an efficient and economical process for recovering valued products from iron and steel slag, where the process is effective to decrease the environmental impact of inventible slag production and desired slag processing.

SUMMARY

Aspects of the present disclosure include methods and systems for co-production of precipitated calcium/magnesium carbonates and water glass with concentration of rare earth elements from iron and steel slag.

Methods and systems according to some embodiments of the present disclosure process slag via physical and chemical pretreatment methods, hydro-metallurgical reforming methods, $CO_2$ bubbling and/or acid leaching with chelating agent, and precipitation/crystallization resulting in formation of value-added products such as iron oxides, aluminum oxide, precipitated calcium/magnesium carbonates, water glass, solid or liquid residue with concentrated rare earth elements, and the like. Some embodiments include $CO_2$ utilization, with one of whose sources from flue gas emissions of other iron and steel making processes.

Methods and systems according to some embodiments of the present disclosure include a manufacturing process that can be implemented to effectively separate and extract iron, iron oxides and ferrites (either magnetic or non-magnetic), physically and chemically, from typical iron and steel slag. Removing the magnetic iron component of different forms in raw slag optimizes additional treatment processes. Common slag presents strong alkalinity or high pH in nature. Methods and system according to some embodiments of the present disclosure incorporate neutralization steps including using slag for desulfurization to facilitate efficient slag extraction and conversion afterwards. Through $CO_2$ bubbling and re-precipitation/crystallization, iron oxides, aluminum oxide and calcium/magnesium carbonates are formed. If rare earth elements are present in raw slag, they are concentrated. Methods and systems according to some embodiments of the present disclosure integrate the slag reforming/activation with hydro-thermal water glass formation. Some embodiments further incorporate unconventional Si source and waste heat derived from slag cooling/quenching. Methods and systems according to the present disclosure improve the utilization of iron and steel slag, reduce the usage of chemical reagents, raw materials and energy, enhance conversion kinetics and efficiency, and produce water glass as an additional valuable product in the slag reutilization process.

Methods and systems according to some embodiments of the present disclosure include processes to recycle both magnetic and non-magnetic iron components and enrich rare-earth elements from iron and steel slag. Methods and systems according to the present disclosure present a green and energy efficient process for reutilizing slag and extracting valuable chemical resources from it, and can be applied to manage other similar industrial wastes such as fly ash or kiln waste.

In some embodiments, the present disclosure is directed to a method of processing slag generated from an iron or steel making process comprising collecting an amount of slag generated from an iron or steel making process, isolating a non-magnetic-material-enriched portion from the slag, collecting a leachate from the non-magnetic-material-enriched portion comprising metal oxides, metal carbonates, and rare-earth elements, precipitating at least one of the metal oxides and the metal carbonates from the leachate, and collecting waste water and rare-earth elements from the leachate. In some embodiments, precipitation is performed utilizing a pH swing process.

In some embodiments, isolating a non-magnetic-material-enriched portion from the slag comprises fracturing the slag into particles comprising magnetic and non-magnetic material and applying a magnetic separation force to the slag particles to produce a magnetic-material enriched portion and a non-magnetic-material enriched portion. In some embodiments, the magnetic separation force is a magnetically assisted fluidized bed.

In some embodiments, collecting a leachate from the non-magnetic-material-enriched portion comprising metal oxides, metal carbonates, and rare-earth elements comprises separating the leachate and a slag residue. In some embodiments, collecting a leachate from the non-magnetic-material-enriched portion comprising metal oxides, metal carbonates, and rare-earth elements comprises washing the non-magnetic-material enriched portion with water, saline, or waste acids to produce a slurry having a basic pH and dissolving a washed slurry of non-magnetic-material enriched portion in a solution comprising an acid and a chelating agent to produce the leachate and the slag residue.

In some embodiments, the method further comprises dissolving the slag residue in NaOH in a conversion reactor to produce water glass and a residue comprising metal-silicates. In some embodiments, the method further comprises cooling the slag, recovering the heat from the slag in the form of steam, and feeding the steam to the conversion reactor. In some embodiments, the method further comprises fracturing the slag into particles having a diameter less than about 200 µm and an average diameter of about 20-25 µm.

In some embodiments, washing the non-magnetic-material enriched portion with water, saline, or waste acids further comprises bubbling $CO_2$ through the slurry, collecting a filtrate from the slurry, heating the filtrate to approximately 80° C., and precipitating at least one metal carbonate. In some embodiments, washing the non-magnetic-material enriched portion with acids further comprises collecting a filtrate from the slurry, providing a metal hydroxide solution, bubbling $CO_2$ through the metal hydroxide solution, collecting precipitated product, and recycling remaining fluid for use in the washing of the non-magnetic-material enriched portion.

In some embodiments, the acid solution is approximately 0.1M HCl or $HNO_3$. In some embodiments, the chelating agent is an approximately 0.01M solution selected from the group consisting of: sodium acetate, oxalate, citrate, picolinate, gluconate, glutamate, propionate, butyrate, valerate, lactate, succinate, phosphate, pyrophosphate, ascorbate, phthalate, and combinations thereof.

In some embodiments, the non-magnetic-material-enriched portion is maintained at approximately 15% by weight non-magnetic-material during at least one of washing the non-magnetic-material enriched portion with water to produce a slurry having a basic pH and dissolving a washed slurry of non-magnetic-material enriched portion in a solution comprising an acid and a chelating agent.

In some embodiments, the method further comprises electrolyzing the leachate waste water to produce HCl and NaOH. In some embodiments, the method further comprises desulfinating a flue gas stream utilizing the non-magnetic-material-enriched portion prior to isolating the non-magnetic-material-enriched portion from the slag.

In some embodiments, the present disclosure is directed to a system for processing slag generated from an iron or steel making process comprising a first source of iron or steel slag, a milling module configured to mill the first source of iron or steel slag to a predetermined size, a magnetically assisted fluidized bed configured to produce a non-magnetic-material-enriched portion from the iron or steel slag, a slag treatment module comprising a fluid stream including at least one of water, saline, acids, and flue gas, configured to contact the non-magnetic-material-enriched portion with the fluid stream, a first precipitation module in fluid communication with the slag treatment module, an acid leaching module comprising an acid and a chelating agent, a separator producing a slag residue stream and at least one leachate stream comprising metal oxides, metal carbonates, and rare-earth elements, a second precipitation module configured to produce at least one of a metal carbonate product, a metal oxide product, and a rare-earth element product, and a conversion reactor in fluid communication with the acid leaching module and configured to produce water glass from the slag residue stream.

In some embodiments, the slag treatment module is further configured to contact a non-magnetic-material-enriched portion from the iron or steel slag with a $CO_2$ stream.

In some embodiments, the system further comprises a first recycled fluid stream comprising fluid from the first precipitation and in fluid communication with the slag treatment module and a second recycled fluid stream in fluid communication with the acid leaching module. In some embodiments, the second precipitation module comprises at least one pH swing reactor.

BRIEF DESCRIPTION OF THE DRAWINGS

The drawings show embodiments of the present disclosure for the purpose of illustrating the invention. However, it should be understood that the present application is not limited to the precise arrangements and instrumentalities shown in the drawings, wherein.

DESCRIPTION

Figure 1:
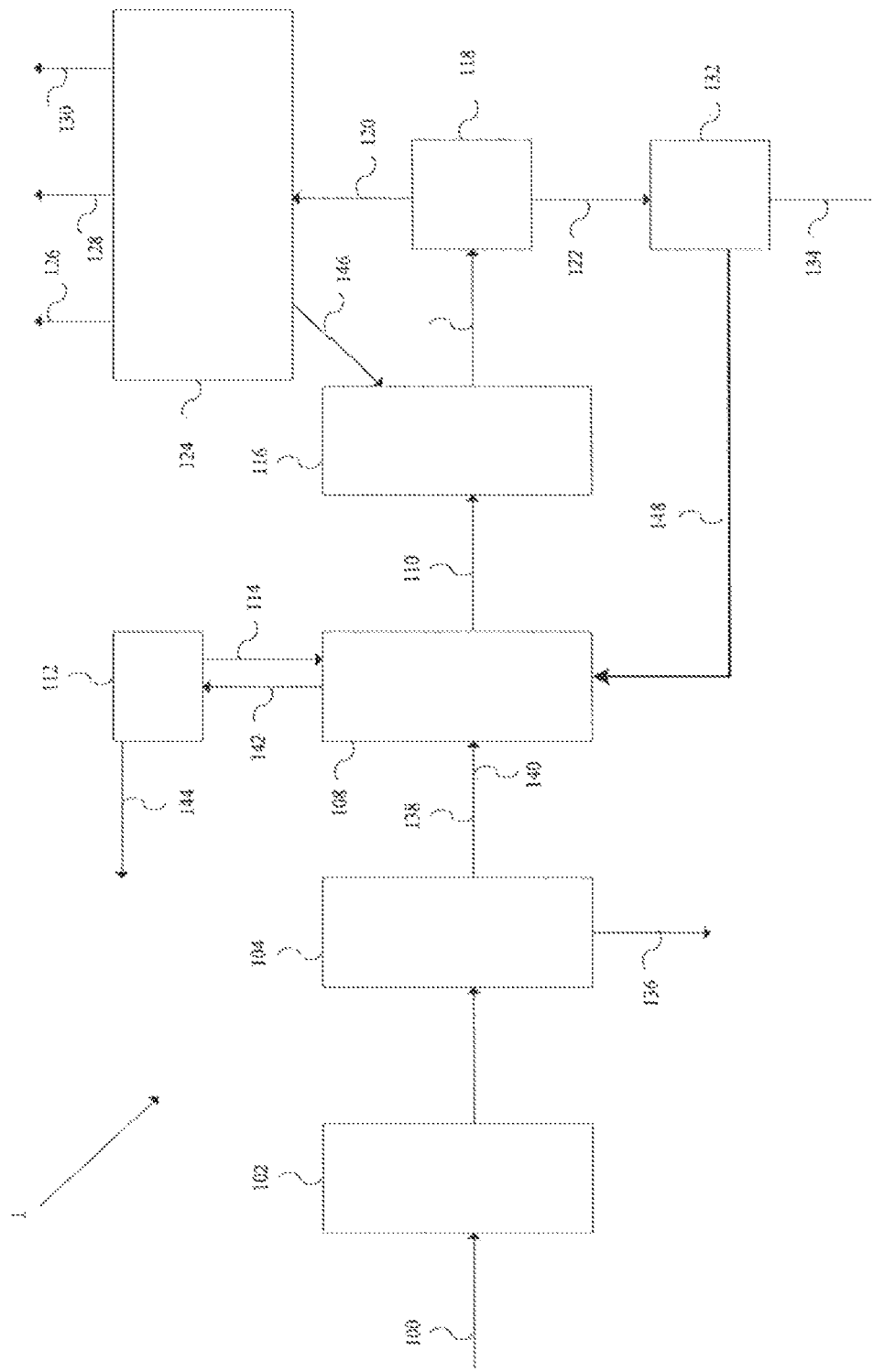
FIG. 1 is a schematic diagram of a system for producing a plurality of products from iron and steel slag according to some embodiments of the present disclosure.

Referring now to FIG. 1, in some embodiments, the present disclosure is directed to a system 1 producing a plurality of products from iron and steel slag. In some embodiments, a first source of iron or steel slag 100 is collected. In some embodiments, the first source 100 is fed to a milling module 102. In some embodiments, the first source 100 is fed to a magnetic separator 104. In some embodiments, a separated portion from the magnetic separator is fed to a slag treatment module 108. Slag treatment module 108 produces a slurry 110.

In some embodiments, first precipitation module 112 is in fluid communication with slag treatment module 108 via at least a first recycled fluid stream 114.

In some embodiments, slurry 110 is fed to an acid leaching module 116, producing a leachate and slag residue. In some embodiments, a separator 118 separates the leachate and the slag residue to produce at least one leachate stream 120 and a slag residue product 122. At least one leachate stream 120 feeds into a second precipitation module 124, producing at least one of a metal carbonate product 126, a metal oxide product 128, and a rare-earth element product 130.

In some embodiments, the slag residue product 122 is fed to a conversion reactor 132 for further processing. In some embodiments, conversion reactor 102 produces a water glass product 134. FIGS. 10A-10H are schematic diagrams of exemplary commercial embodiments of the system of FIG. 1 consistent with some embodiments of the present disclosure.

Referring again to FIG. 1, in some embodiments, the first source 100 is fed to a milling module 102. Milling module 102 serves to break up first source 100 into smaller, predetermined size. In some embodiments, the predetermined size is the ideal size for separation by magnetic separator 104. Typically, slag pellets begin with a diameter range of about 5-30 cm. In some embodiments, first source 100 is milled until it is comprised of particles having a diameter at least less than 200 μm. In some embodiments, first source 100 is milled until it is comprised of particles having an average diameter of the particles comprising first source 100 is 20-25 μm.

Referring again to FIG. 1, some embodiments of the present disclosure comprise a magnetic separator 104. Magnetic separator 104 separates a magnetic-enriched portion 136 of first source 100 from the non-magnetic enriched portion 138. In some embodiments, magnetic separator 104 enriches stream for target elements such as Ca, Mg, Fe, Si, rare-earth elements, and the like. In some embodiments, particle entrainment is maintained below about 10% by weight. In some embodiments, magnetic separator 104 is a magnetically assisted fluidized bed separator. In some embodiments, the separation force is provided by a solenoid (not pictured) installed within magnetic separator 104. The size and shape of the fluidized bed, as well as the size and placement of the solenoid, are matters of design choice. In some embodiments, a plurality of magnetic separators 104 are placed in series. In some embodiments, gas flow rates within the fluidized bed is controlled. In some embodiments, superficial gas flow rates of the magnetic separators 104 connected in series will be greatest for the first separator and reduced for the later separators. In some embodiments, humidity is controlled within magnetic separator 104. In some embodiments, humidity within magnetic separator 104 is maintained between about 10% and 50%. In some embodiments, electricity is supplied to magnetic separator 104 via a DC power unit. In some embodiments, the power unit provides a current of approximately 0-20 A, with a maximum voltage of about 1.4V and a maximum field strength of about 180 Gauss. However, these electric conditions are amplifiable for use in scaled up applications of system 1. In some embodiments, magnetic separator 104 is instead replaced by a floatation separator, a gravity separator, an electrostatic separator, and the like.

In some embodiments, magnetic-enriched portion 136 comprises a higher concentration of metals such as iron. In some embodiments, magnetic-enriched portion 136 comprises a lower concentration of rare-earth elements. Recoverable products in magnetic-enriched portion 136 include metal (such as iron), oxides (such as iron oxide), and ferrites. In some embodiments, non-magnetic-enriched portion 138 comprises a higher concentration of rare-earth elements. Recoverable products in non-magnetic-enriched portion 138 mainly include metal oxides, metal carbonates, water glass, rare-earth elements, and silicates.

Referring again to FIG. 1, in some embodiments system 1 comprises a separated portion 140 from magnetic separator 104 that is fed to slag treatment module 108. In some embodiments, separated portion 140 comprises non-magnetic enriched portion 138. In some embodiments, slag treatment module 108 contacts non-magnetic-enriched portion 138 with a fluid stream to neutralize that portion. Contact duration between the fluid stream and non-magnetic-enriched portion 138 varies from less than about 0.5 hours to more than 24 hours. The contact between the fluid stream and non-magnetic-enriched portion 138 results in slurry 110. In some embodiments, the target weight % of dispersed slag in slurry 110 is selected from the group consisting of 0.1%, 1%, 5%, 10%, and 15%, and slurry 110 is removed from slag treatment module 108 at approximately is target weight %. In some embodiments, the contacting of the fluid stream with non-magnetic-enriched portion 138 is performed as a plurality of washes. In some embodiments, treatment of non-magnetic-enriched portion 138 continues until a predetermined basic pH in slurry 110 is achieved, as will be discussed in greater detail below. For each wash, pH plateaus within about 15 to 30 minutes. Therefore, the residence time can be determined by monitoring the pH variation rate (dpH/dt) in real-time.

In some embodiments, the fluid stream comprises water. In some embodiments, non-magnetic-enriched portion 138 is treated with water until production of a slurry 110 with a pH of about 11.

In some embodiments, the fluid stream comprises saline. In some embodiments, the saline stream comprises at least one of NaCl, $NaNO_3$, $NaClO_4$ and other potential Li, Na and K based soluble salts. The amount of salt added is determined by the weight and slurry density of slag in addition of the solubility of salt itself. In some embodiments, the maximum salt/slag weight ratio is approximately 80.

In some embodiments, the fluid stream comprises acids. In some embodiments, the acids are waste acids from another process, such as another part of the iron or steel making process. In some embodiments, the acids comprise strong acids such as $HNO_3$, HCl, $H_2SO_4$. In some embodiments, non-magnetic-enriched portion 138 is treated with acids until production of a slurry 110 with a pH of about 7.

In some embodiments, the fluid stream is an effluent flue gas from a separate process. In these embodiments, the non-magnetic-material enriched portion 138 effectively substitutes for lime or limestone and results in $CaSO_3$/$CaSO_4$/$CaSO_4$ and other trace components.

In some embodiments, the fluid stream comprises $CO_2$. In these embodiments, $CO_2$ is bubbled through a slurry 110 created by non-magnetic-enriched portion 138 and either water or saline as described above. The bubbled $CO_2$ is effective to neutralize non-magnetic-material enriched portion 138 in slag treatment module 108.

In some embodiments, pre-treated slag in the fluid stream is activated via hydro-thermal alkaline reforming into slurries with different bases at different slag/alkaline ratios, temperatures and pressures in order to enhance the reaction kinetics and overall conversion of the pre-treated slag.

Alkaline reformed slag is subsequently dissolved by $CO_2$ bubbling and the carbonized leachate is used for re-precipitation of metal carbonates.

In these embodiments, pre-treated slag is mixed with NaOH in a water based slurry. Sample/NaOH weight ratio corresponds to the NaOH stoichiometric ratio in the bracket, ranging from 1 (100%), 2 (50%), 4 (25%), 10 (10%) and 20 (5%). In some embodiments, the alkaline comprises KOH, $NH_4OH$, Li, Na, K, $NH_4^+$ based salts (such as $LiBO_4$, $Li_2B_4O_7$, $Na_2CO_3$, $NaHCO_3$, $K_2CO_3$, $KHCO_3$, $(NH_4)_2CO_3$, $NH_4HCO_3$) and the like. The slurry is thermally treated ranging from 120 to 250° C. In some embodiments, the starting pressure of the reactor at saturated water vapor pressure corresponds to the specific target reaction temperature. For the purpose of pre-pressurizing the reactor, at least one of air or $N_2$ are applied. In some embodiments, the reaction time of alkaline reforming is about 2 hours.

After thermal treatment and cooling of the reaction system, slurry is separated into solid (reformed slag) and liquid (alkaline filtrate). In some embodiments, separated solids are sent to slag treatment module 108 described above for treatment with the described water, saline, and the like. In some embodiments, $CO_2$ is then bubbled through the reformed slag and metal carbonates are precipitated as a product. In some embodiments, remaining liquid is then reused in the $CO_2$ bubbling of subsequent reformed slag.

In some embodiments, insoluble slag produced from CO2 bubbling is mixed with the alkaline filtrate. According to the $SiO_2/Na_2O$ ratio, ranging from 2-3.5 in the final product, alkaline filtrate and insoluble slag are mixed according to specific ratio. In some embodiments, additional $SiO_2$ is also added. In some embodiments, water glass is formed. In some embodiments, the formation process takes 2 hours or less in the environment of steam, ~120° C., supplied by the steam produced from the slag cooling process. In some embodiments, metal ions are removed as products via pH swing processes. In some embodiments, resultant residue comprises elevated concentrations of real-earth elements. In some embodiments, the resultant residue is recycled for use in rare-earth element concentration and isolated processes discussed elsewhere in the present disclosure. In some embodiments, remaining liquid is recycled to slag treatment module 108.

As discussed above and again referring to FIG. 1, in some embodiments slag treatment module 108 is in fluid communication with first precipitation module 112. As fluid streams are contacted with non-magnetic-enriched portion 138, an effluent stream 142 is created. In some embodiments, effluent stream 142 is fed to first precipitation module 112, where it undergoes treatment allowing for the production of a first recycled stream 114 and a precipitated product 144. In some embodiments of first precipitation module 112, $CO_2$ is bubbled through effluent stream 142. In some embodiments, effluent stream is contacted with an alkali solution, such as those comprising $Na_2CO_3$ or NaOH. In some embodiments, precipitated product 144 is produced via a pH swing process. In some embodiments, effluent stream 142 is heated. In some embodiments, effluent stream is heated to approximately 80° C. First recycled stream 114 comprises fluid still useful for use by slag treatment module 108 (water, saline, and the like), and thus is returned to slag treatment module 108 for use in the treatment of fresh non-magnetic enriched-portion 138. In some embodiments, precipitated product 144 comprises at least one metal carbonate, such as calcium carbonate or magnesium carbonate. In some embodiments, precipitated product 144 comprises at least $CaSO_3/CaSO_4/Ca(NO_3)_2/CaCO_3$ and $CaCO_3$.

As discussed above and again referring to FIG. 1, slurry 110 is fed to acid leaching module 116. In some embodiments, acid leaching module 116 comprises an acid and a chelating agent. The acid and the chelating agent are contacted with slurry 110 to produce a reaction resulting in the generation of a leachate product and a slag residue product. In some embodiments, the acid for use in acid leaching module 116 is selected from the group consisting of: HCl, HNO3, and combinations thereof. In some embodiments, the chelating agent is selected from the group consisting of: sodium acetate, oxalate, citrate, picolinate, gluconate, glutamate, and the like and combinations thereof. As discussed above, in some embodiments acid leaching module maintains slurry 110 at a weight % selected from the consisting of: of 0.1%, 1%, 5%, 10%, and 15%. In some embodiments, the reaction time is at least 2 hours. In some embodiments, the reaction is performed at a temperature of approximately 60°-90° C.

Referring again to FIG. 1, the leachate and slag residue produced by the acid leaching module are separated with separator 118 into at least one leachate stream 120 and slag residue product 120. In some embodiments, the at least one leachate stream 120 comprises at least one of metal oxides, metal carbonates, and rare-earth metals. The at least one leachate stream 120 is then processed at second precipitation module 124. As discussed above, second precipitation module 124 produces at least one of a metal carbonate product 126, a metal oxide product 128, and a rare-earth element product 130. In some embodiments, at least one of products 126, 128, and 130 is produced via a pH swing process. In some embodiments, second precipitation module 124 includes a $CO_2$ stream for bubbling through leachate 120. In some embodiments, second precipitation module 124 includes an NaCO3 stream for contacting with leachate 120. In some embodiments, remaining leachate is recycled back as second recycled fluid stream 146 to acid leaching module 116 to assist in dissolution of the next batch of slurry 110.

In some embodiments, rare-earth element product 130 ends up concentrated within metal oxide product 128 or in the remaining leachate after removal of any products 126 and 128. In these embodiments, additional separation steps are implemented to arrive at rare-earth element product 130. In some embodiments, rare-earth element product 130 is concentrated by use of an absorbent.

In some embodiments, the metal carbonate products described in the present disclosure are primarily calcium and magnesium carbonates. In some embodiments, the metal oxide products described in the present disclosure are primarily iron oxides and aluminum oxides.

In some embodiments, molten slag is provided. In some embodiments, the molten slag is cooled. In some embodiments, the slag is cooled to a temperature of about 80° C. In some embodiments, the heat from this cooling process is recovered as steam and used in other aspects of the present disclosure. In some embodiments, the steam is used in first precipitation module 112 to heat effluent stream 142. In some embodiments, the steam is used in the thermal treatment of the slurry as described above.

In some embodiments, the steam is fed to conversion reactor 132 to aid in the generation of water glass product 134. Slag residue product 122 comprises mostly silica and non-dissolved metal silicates. In some embodiments, water glass product 134 is dissolved in NaOH in conversion reactor 132 according to the following equation:

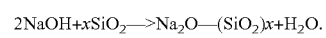

where x=1 to ~3.5. In some embodiments, the steam added to aid in the above-identified water glass production reaction is at least about 120° C. In some embodiments, water glass is purified. In embodiments comprising flue gas desulphurization, due to certain solubility of $CaSO_4$ in NaOH depending on the pH, the formed water glass contains some sulfate ions in the form of $Na_2SO_4$. In some embodiments, insoluble $CaSO_4$ is mixed with other insoluble solids, mostly metal hydroxides, which are then dissolved in liquid such as water for carbonation and production of additional metal carbonates. In some embodiments, after carbonation, the water is recycled for washing the insoluble mixture of next batch. In some embodiments, insoluble $CaSO_4$ is eventually collected as a solid.

After water glass product 134 is produced and subsequently recovered, the remaining slag residue 122 contains metal hydroxide precipitates and undissolved metal silicates, such as Ca, Mg, Al, Fe, and others. In some embodiments, remaining insoluble components, such as undissolved metal silicates, are recycled to slag treatment module 108. In some embodiments, remaining insoluble components are recycled back to acid leaching module 116 as recycle stream 148.

Figure 2:
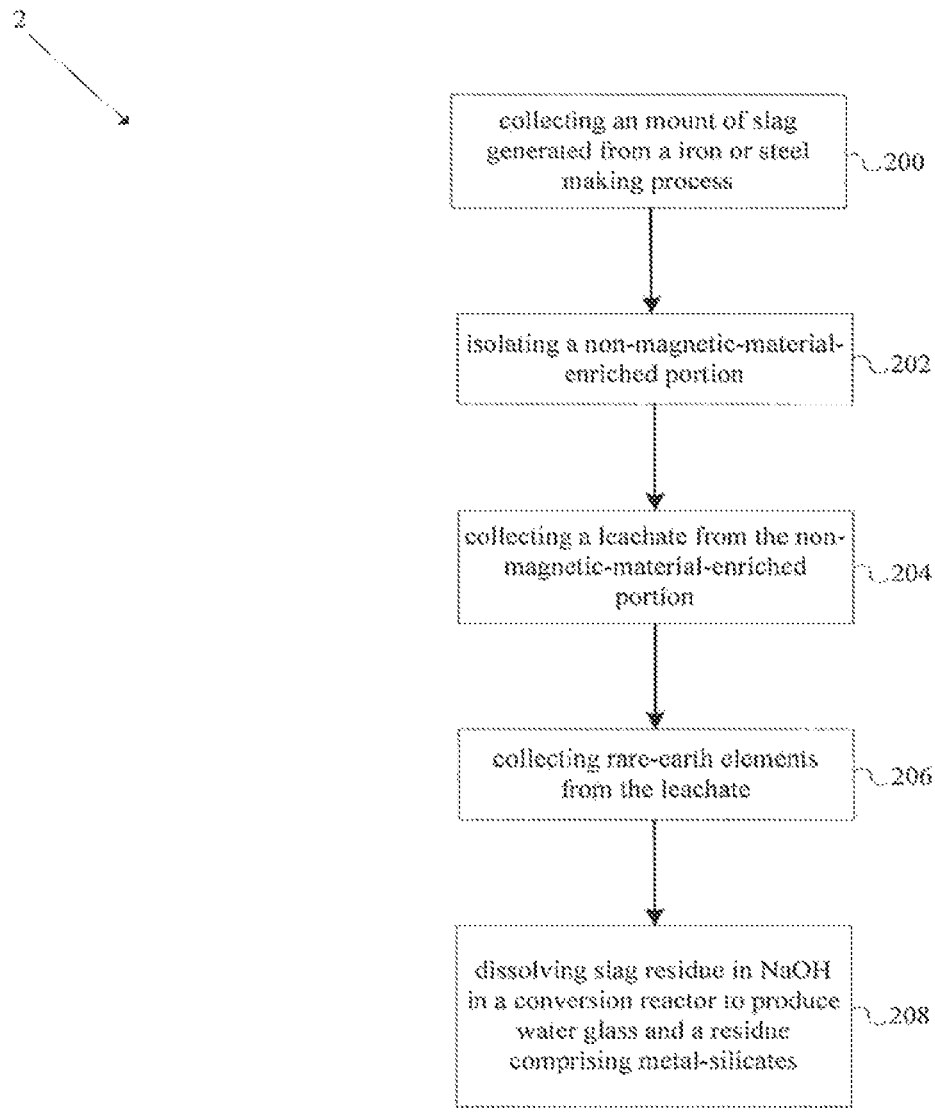
FIG. 2 is a chart of a method for producing a plurality of products from iron and steel slag according to some embodiments of the present disclosure utilizing the system shown in FIG. 1.

Referring to FIG. 2, in some embodiments, the present disclosure is directed to a method 2 of processing slag generated from an iron or steel making process. In some embodiments, method 2 comprises collecting 200 an amount of slag generated from an iron or steel making process. From the amount of slag, a non-magnetic-material-enriched portion is isolated 202. In some embodiments, a leachate from the non-magnetic-material-enriched portion is collected 204. A slag residue is collected as well. In some embodiments, at least one metal oxide or metal carbonate are precipitated from the leachate. In some embodiments, rare-earth elements are collected 206 from the leachate. In some embodiments, slag residue is dissolved 208 in NaOH in a conversion reactor to produce water glass and a residue comprising metal-silicates.

Figure 3:
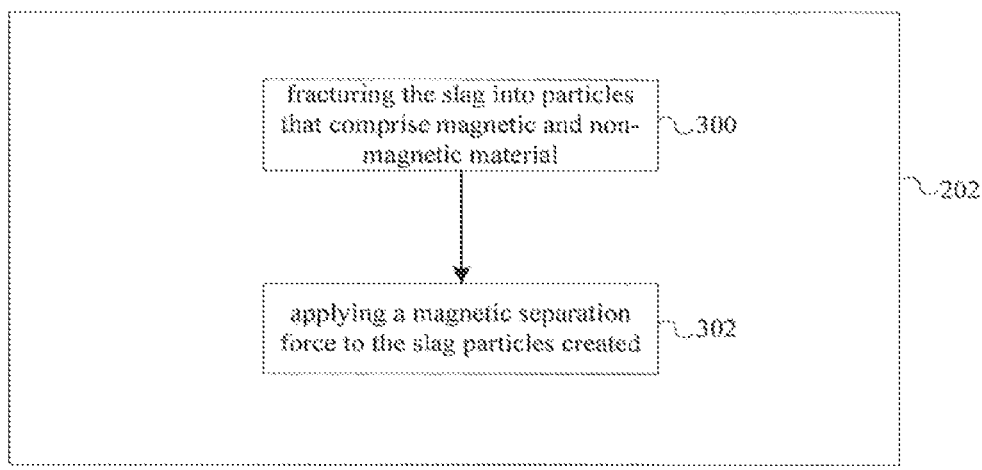
FIG. 3 is a chart of additional steps included in a further embodiment of the method for producing a plurality of products from iron and steel slag shown in FIG. 2.

Referring to FIG. 3, in some embodiments, isolating 202 the non-magnetic-material-enriched portion further comprises fracturing 300 the slag into particles that comprise magnetic and non-magnetic material. In some embodiments, isolating 202 the non-magnetic-material-enriched portion further comprises applying 302 a magnetic separation force to the slag particles created by fracturing 300. As discuss above, applying 302 the magnetic separation force produces a magnetic-material enriched portion and a non-magnetic-material enriched portion.

Figure 4:
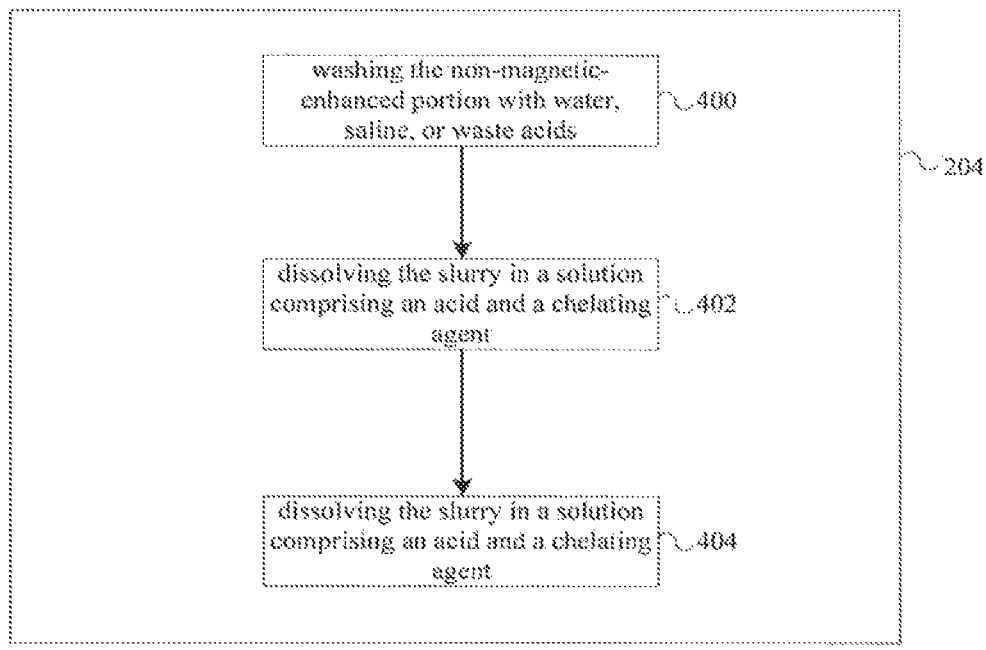
FIG. 4 is a chart of additional steps included in a further embodiment of the method for producing a plurality of products from iron and steel slag shown in FIG. 2.

Referring to FIG. 4, in some embodiments, collecting 204 a leachate from the non-magnetic-material enhanced portion further comprises washing 400 the non-magnetic-enhanced portion with water, saline, or waste acids. In some embodiments, washing 400 produces a slurry having a basic pH. In some embodiments, collecting 204 a leachate from the non-magnetic-enhanced portion further comprises dissolving 402 the slurry in a solution comprising an acid and a chelating agent. In some embodiments, collecting 204 a leachate from the non-magnetic-material enriched portion comprises separating 404 the leachate from the slag residue.

Figure 5:
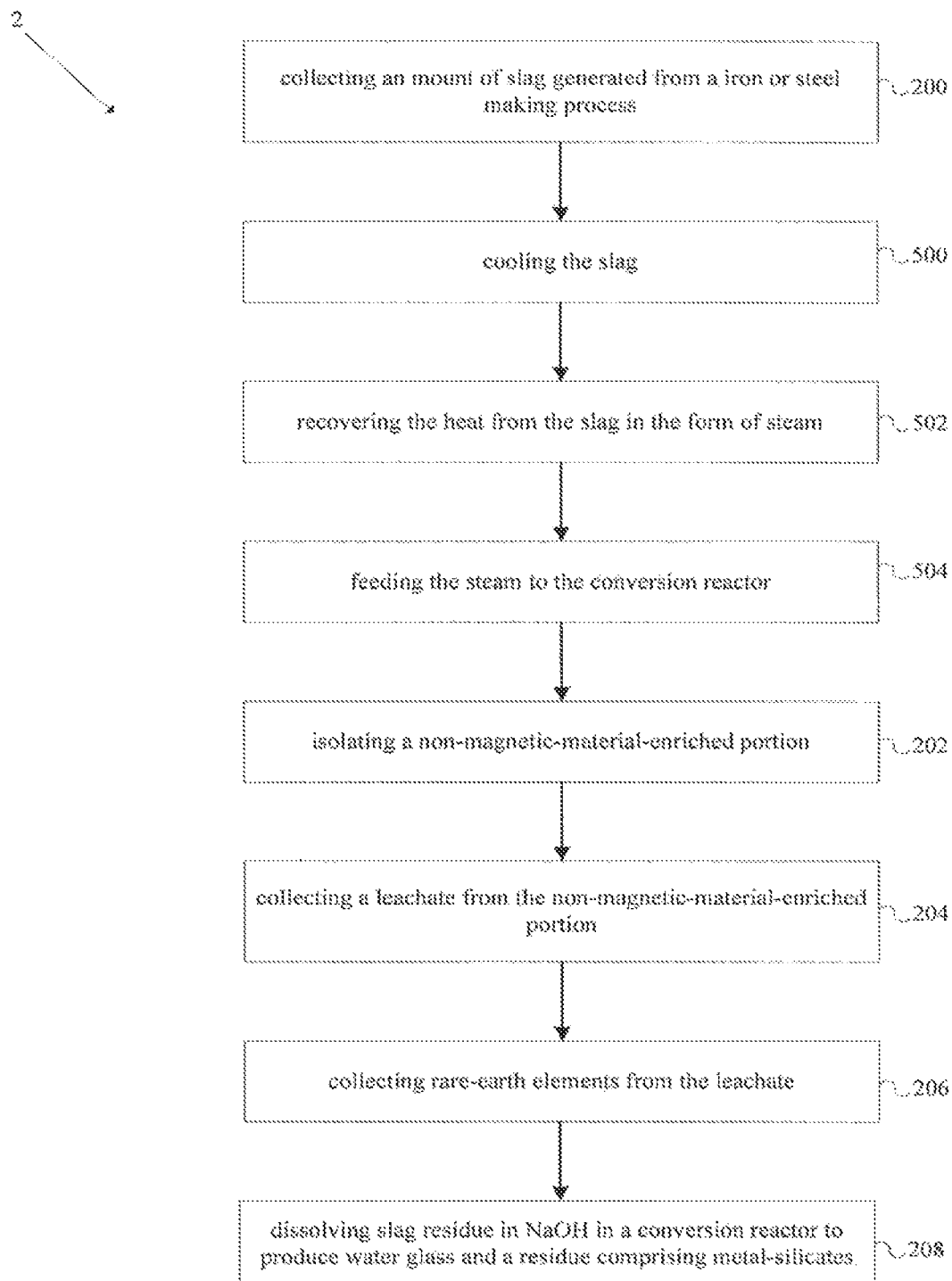
FIG. 5 is a chart of additional steps included in a further embodiment of the method for producing a plurality of products from iron and steel slag as shown in FIG. 2.

Referring to FIG. 5, in some embodiments, method 2 further comprises cooling 500 the slag, recovering 502 the heat from the slag in the form of steam, and then utilizing the steam elsewhere in the system. As discuss above, in some embodiments, the steam is fed 504 to the conversion reactor for use in the conversion reactor to aid in water glass production or in the precipitation of metal carbonates from the first precipitation module.

Figure 6:
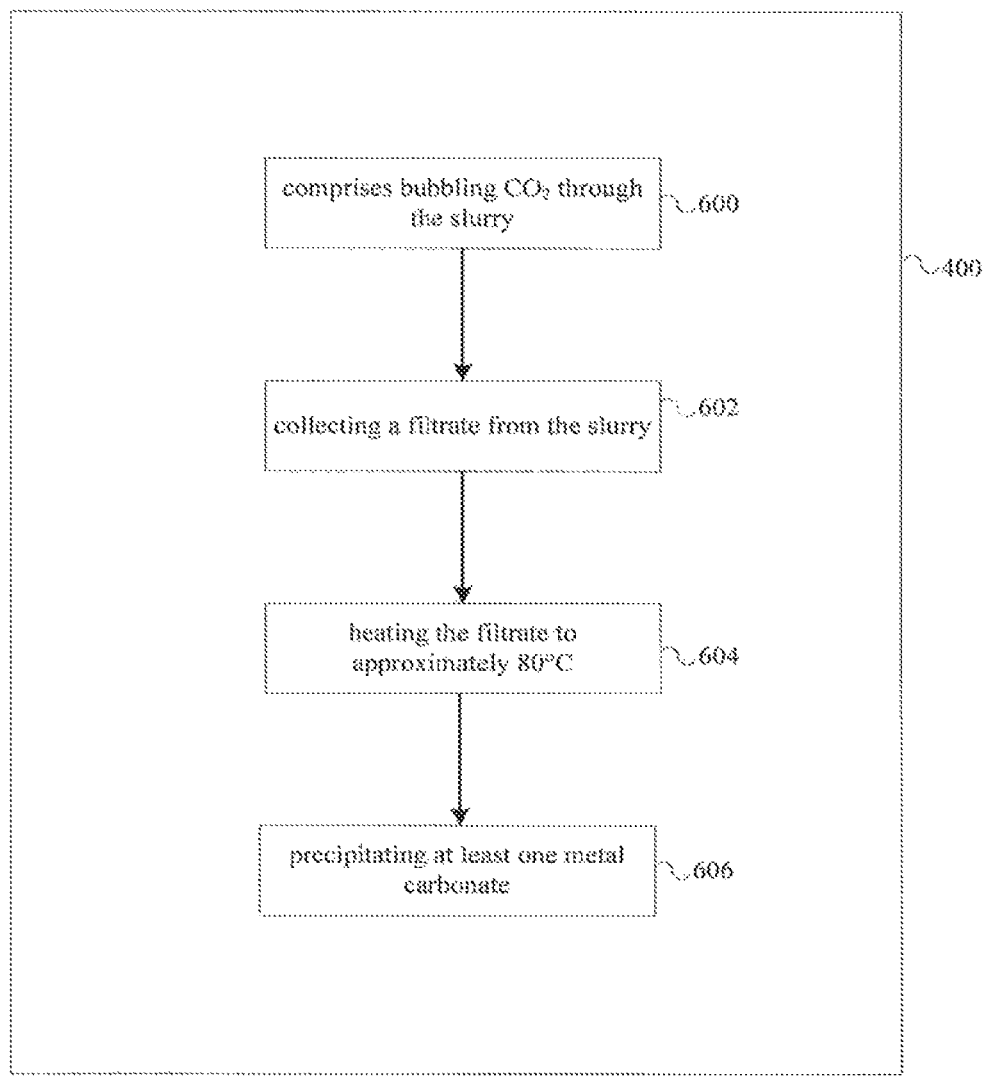
FIG. 6 is a chart of additional steps included in a further embodiment of the method for producing a plurality of products from iron and steel slag as shown in FIG. 4.

Referring now to FIG. 6, in some embodiments, washing 400 the non-magnetic-material enriched portion with water, saline, or waste acids further comprises bubbling 600 $CO_2$ through the slurry, collecting 602 a filtrate from the slurry, heating 604 the filtrate to approximately 80° C., and precipitating 606 at least one metal carbonate.

Figure 7:
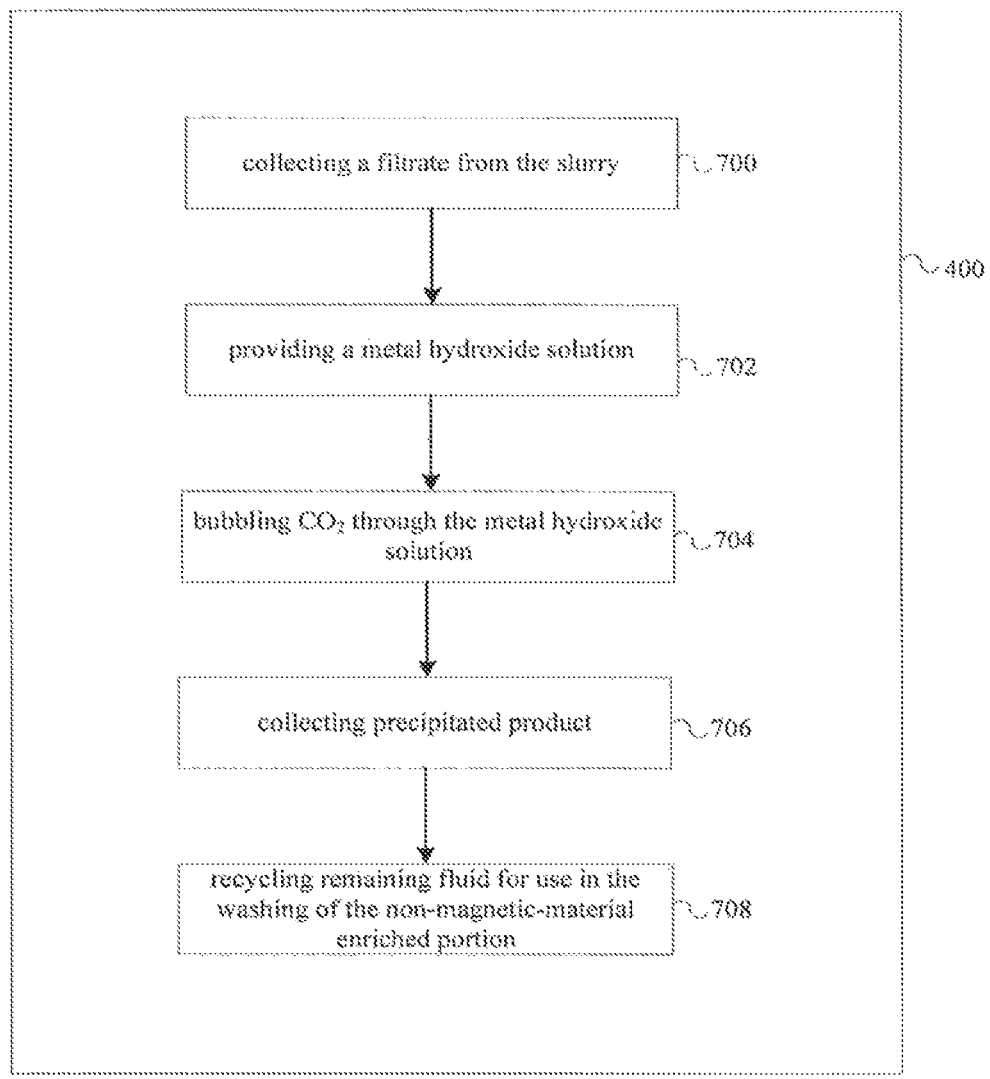
FIG. 7 is a chart of additional steps included in a further embodiment of the method for producing a plurality of products from iron and steel slag as shown in FIG. 4.

Referring now to FIG. 7, in some embodiments, washing 400 the non-magnetic material enriched portion further comprises collecting 700 a filtrate from the slurry, providing 702 a metal hydroxide solution, bubbling 704 $CO_2$ through the metal hydroxide solution, collecting 706 precipitated product, and recycling 708 remaining fluid for use in the washing of the non-magnetic-material enriched portion.

Figure 8:
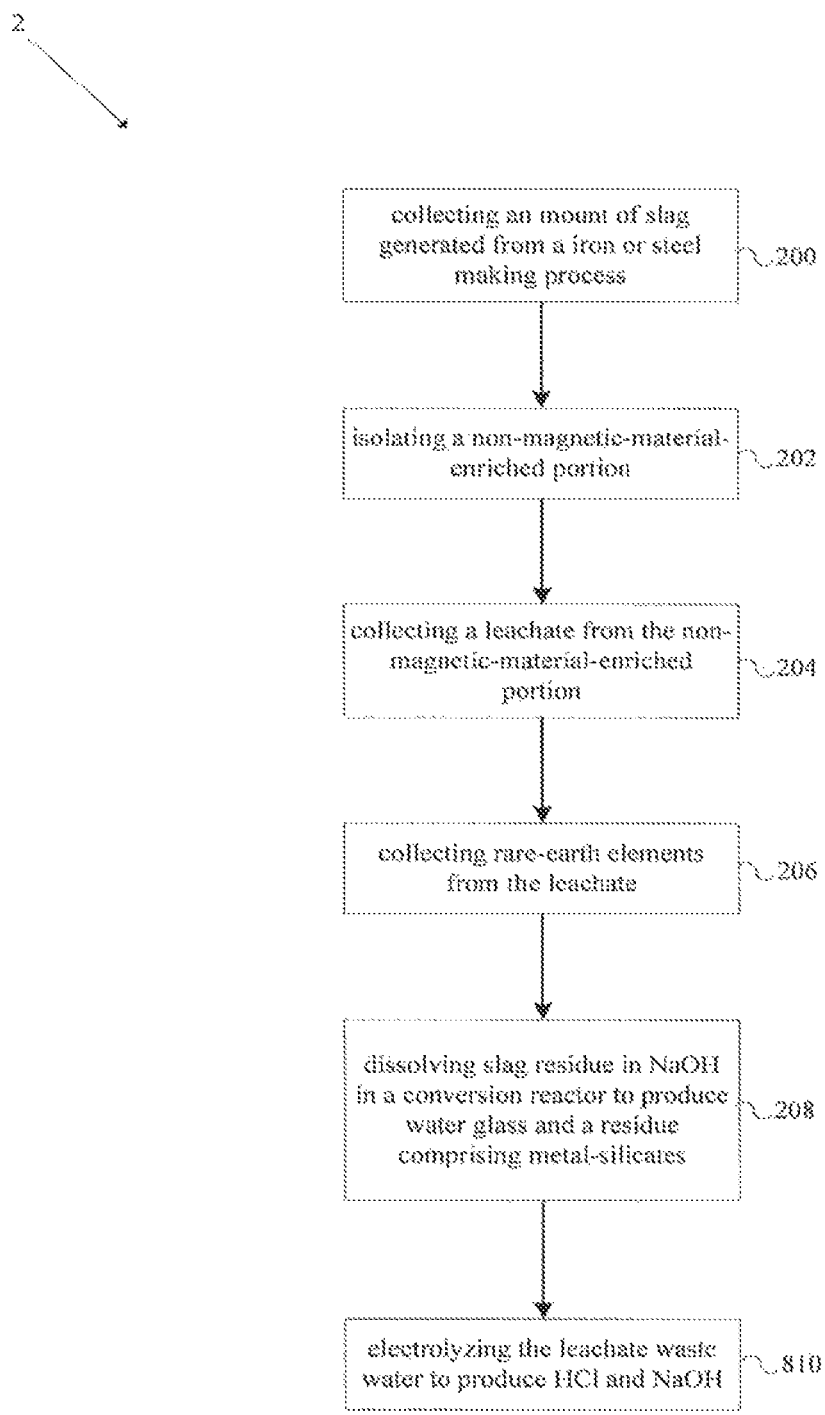
FIG. 8 is a chart of additional steps included in a further embodiment of the method for producing a plurality of products from iron and steel slag as shown in FIG. 2.

Referring to FIG. 8, in some embodiments, method 2 further comprises electrolyzing 810 the leachate waste water to produce HCl and NaOH.

Figure 9:
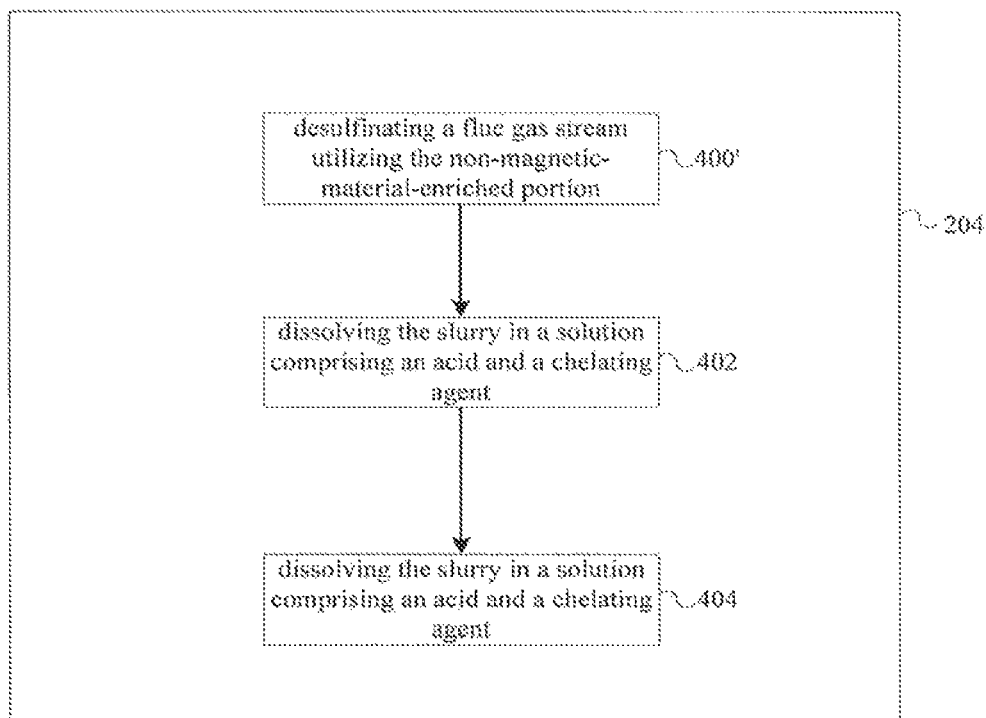
FIG. 9 is a chart of additional steps included in a further embodiment of the method for producing a plurality of products from iron and steel slag as shown in FIG. 2.
Figure 10A:
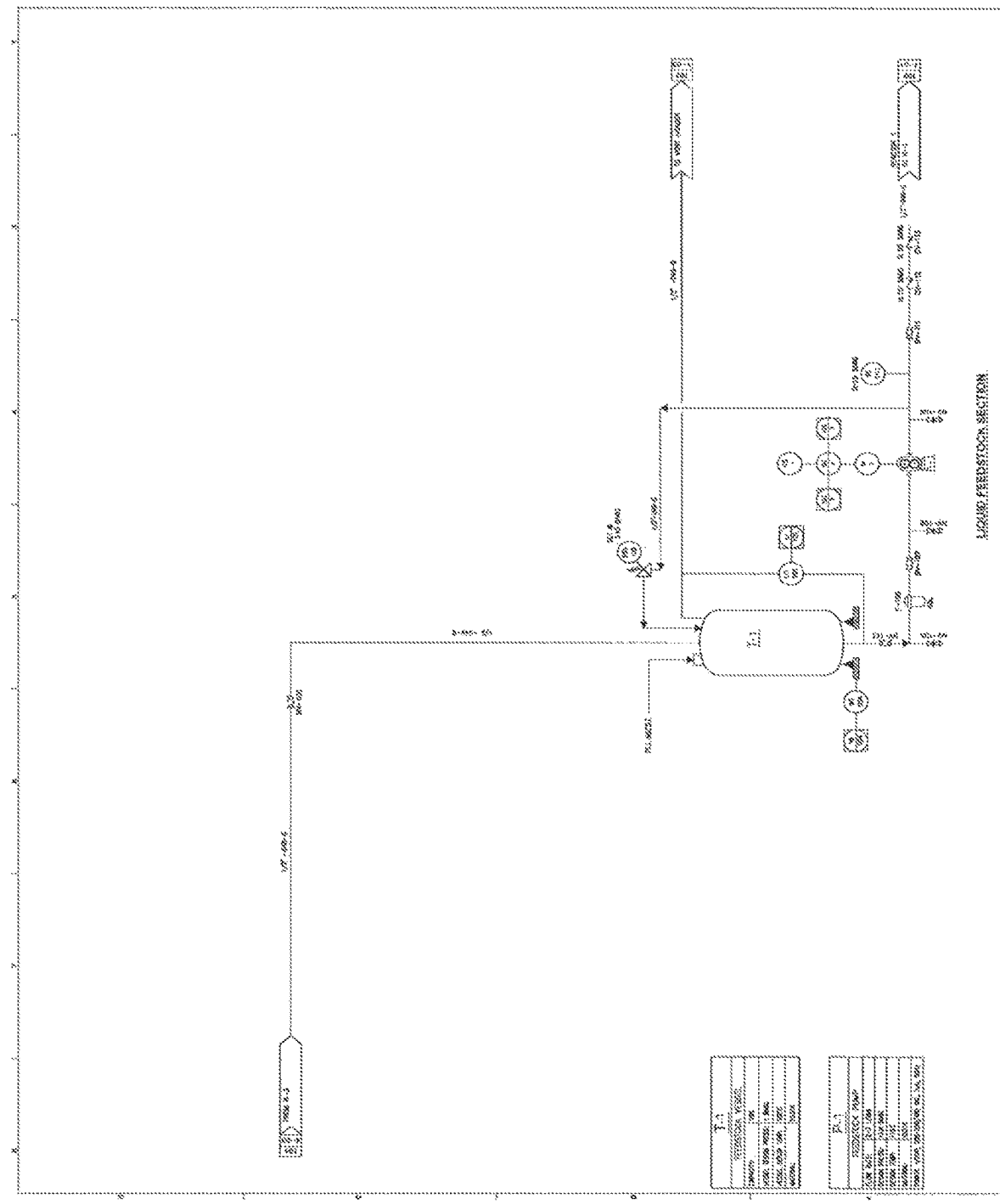
FIGS. 10A-10H are schematic diagrams of exemplary commercial embodiments of the system shown in FIG. 1.
Figure 10B:
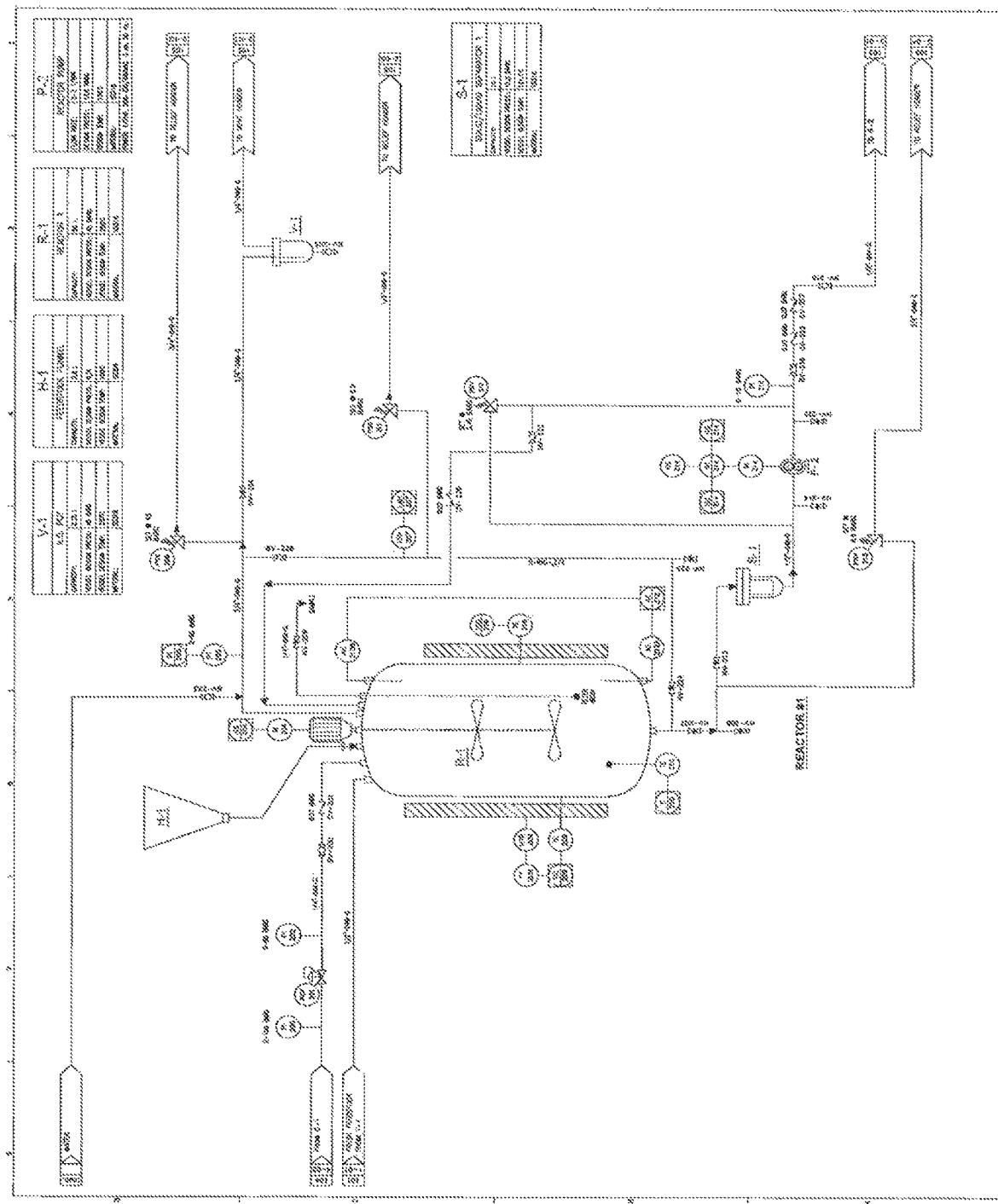
Figure 10C:
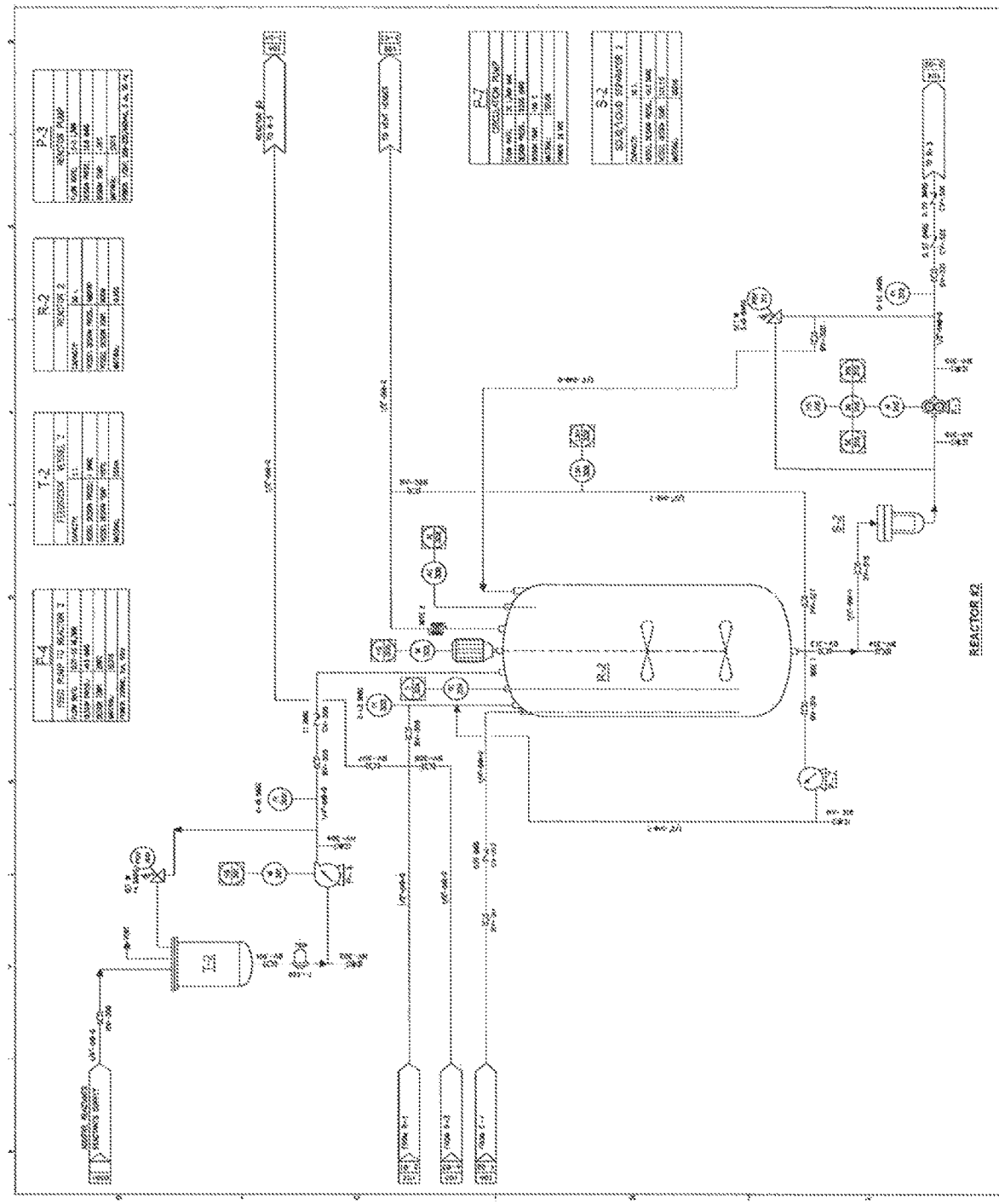
Figure 10D:
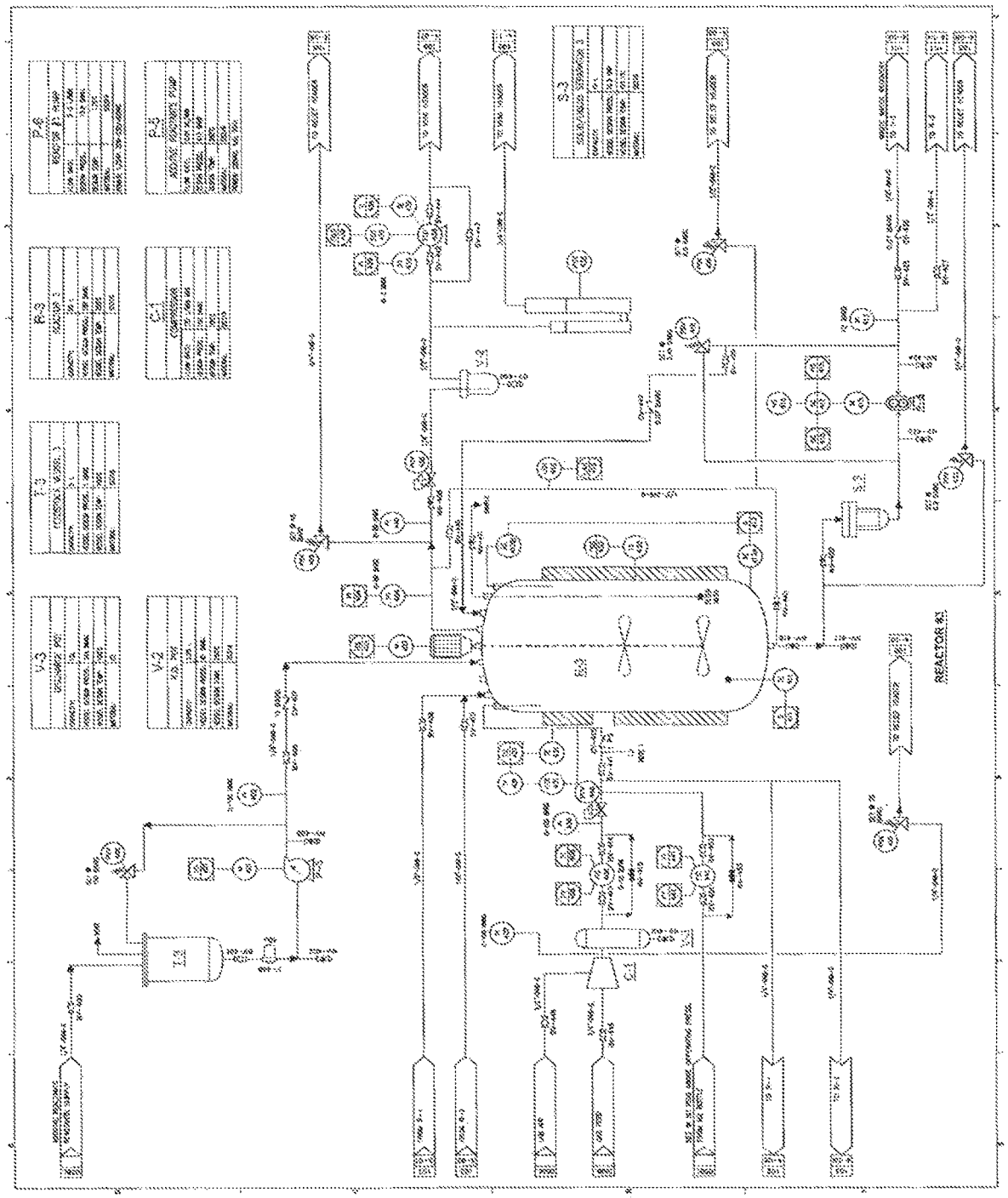
Figure 10E:
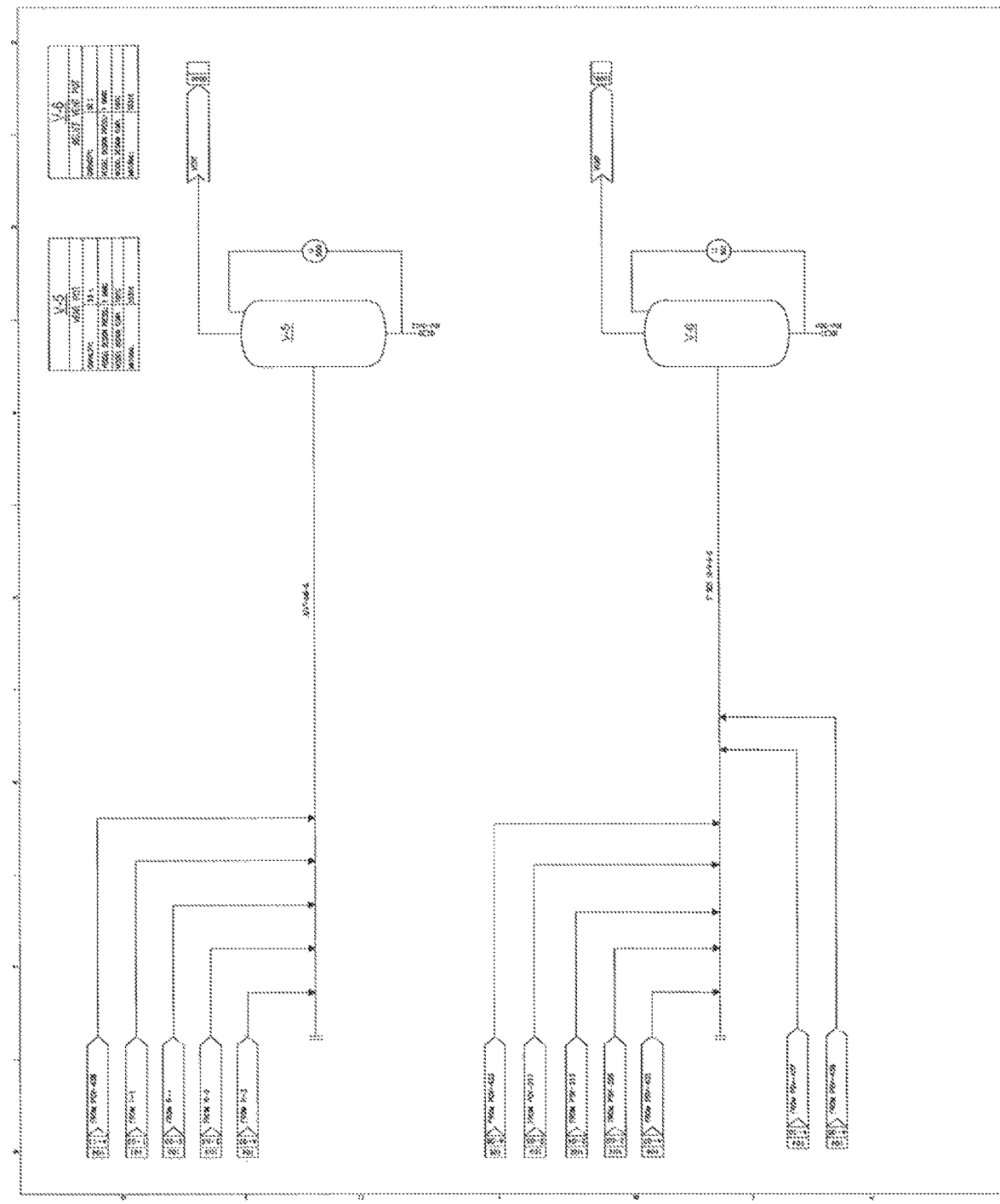
Figure 10F:
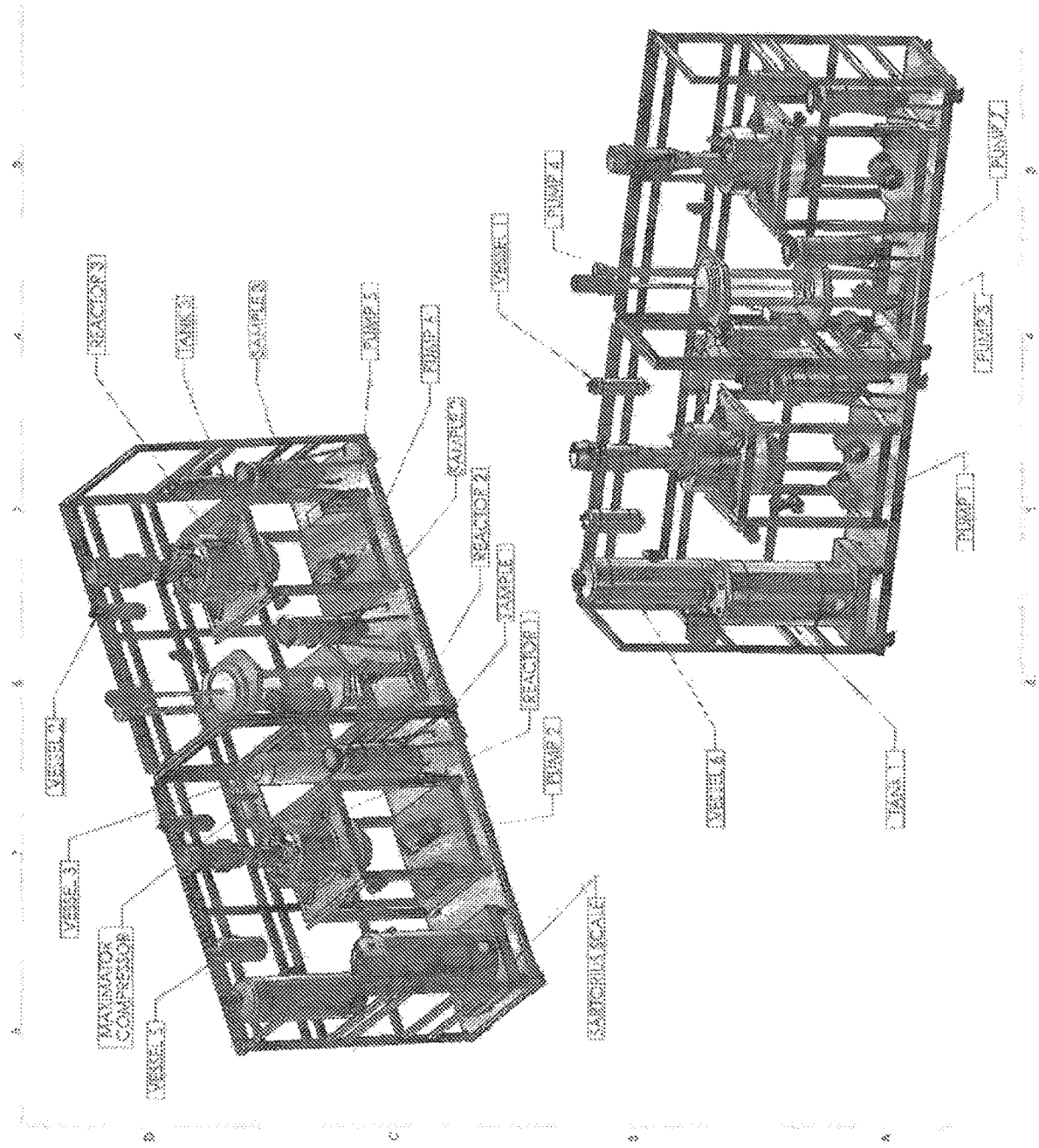
Figure 10G:
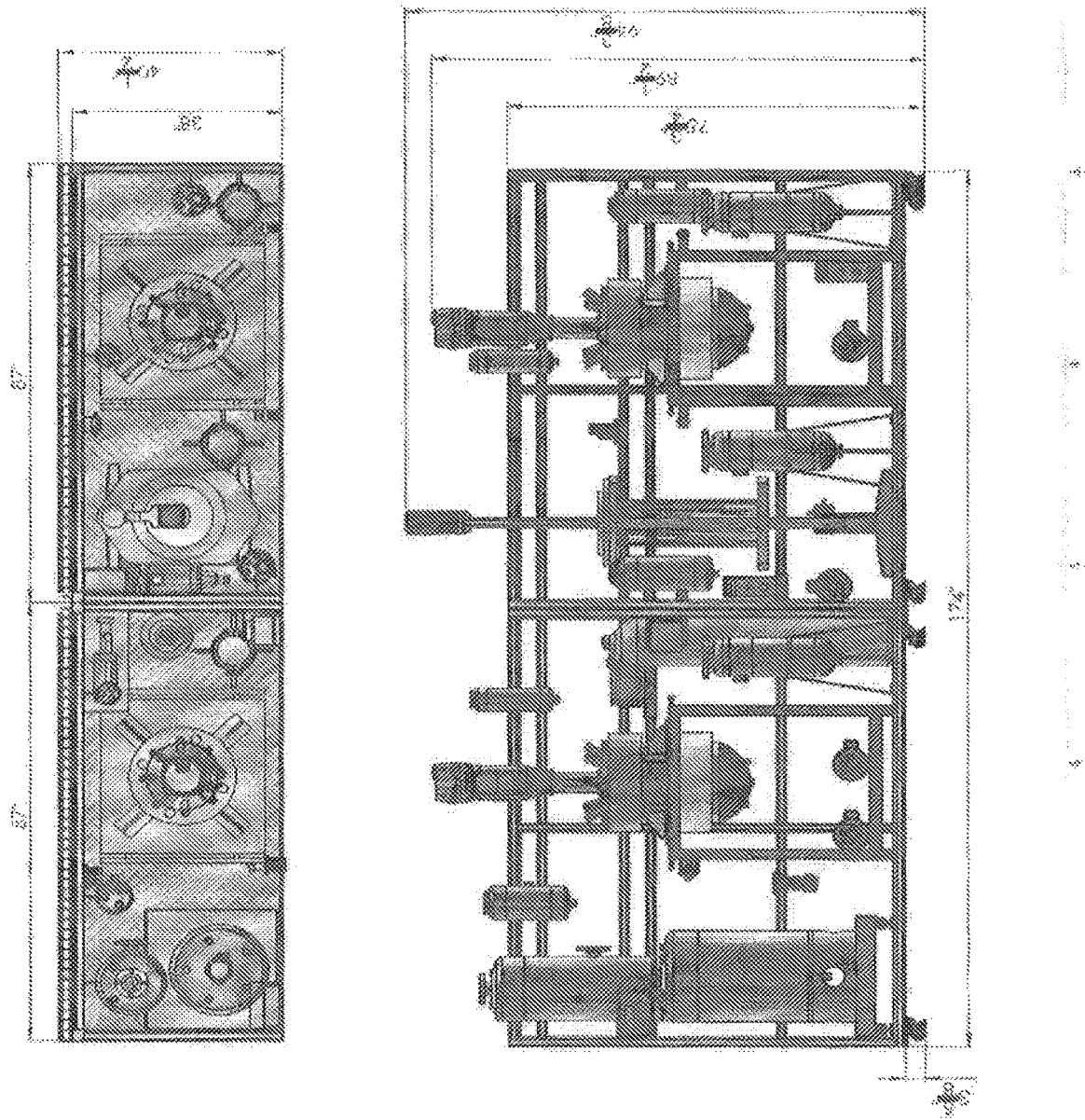
Figure 10H:
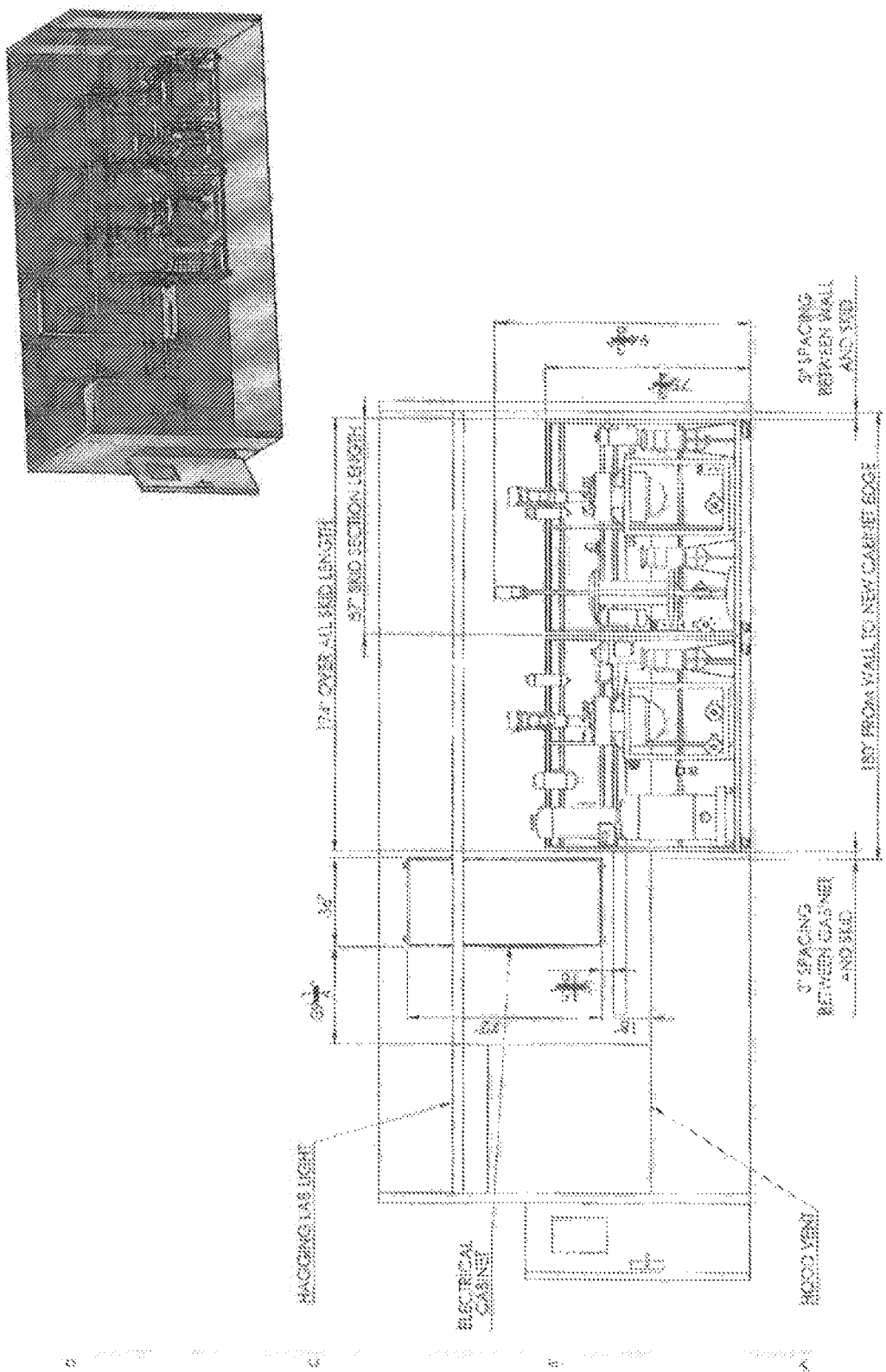

Referring to FIG. 9, in some embodiments, collecting 204 a leachate from the non-magnetic-material enhanced portion further comprises desulfinating 400' a flue gas stream utilizing the non-magnetic-material-enriched portion.

With excess NaOH, $Ca(OH)_2$ is detected in the solid product after reaction, however, reverse reaction normally happens quite easily. Therefore the amount of $Ca(OH)_2$ remaining in slag residue will be limited. Mg is also contained in slag ranging from 5-10 wt %. Actual crystalline phases detected in the solid product include, but are not limited to, $NaCa_2Si_3O_8(OH)$, $Ca_5Si_6O_{16}(OH)_2$, $Ca_6Si_2O_7(OH)_6$, $Mg_3Si_2O_5(OH)_4$.

Fe-lean slag, e.g. iron slag or blast furnace slag, often contains Al 5-15 wt % and $CaAlSiO_6$, $Ca_3Al_2(SiO_4)_2(OH)_4$, $Ca_5Al_2(SiO_4)_3(OH)_4$, $Ca_{19}Al_{11}Mg_2Si_{18}O_{69}(OH)_9$ were detected in the solid residue after alkaline reforming. In the case of excessive NaOH, Al is also measured up to about 0.02-0.05 wt % in the form of $(AlO_2)^-0$ dispersed in the alkaline filtrate.

In Fe-rich slag, mostly steel slag such as basic oxygen furnace slag or electric arc furnace slag, the iron content in the form of FeO could be up to 30 wt %. Ti and Mn are also measured around 1 wt %. In the raw Fe-rich slag, major crystalline phases detected include: $Ca_2SiO_4$, $Ca_7Mg(SiO_4)_4$, $Ca_2Fe_2O_{5.12}$, $Ca_3Mn_{1.2}Fe_{1.8}O_8$, $Ca_2P_2O_7$, $CaTiO_3$, $Fe_2O_3$, $Fe_3O_4$. After alkaline reforming, the major crystalline phases detected include, but are not limited to, $Ca(OH)_2$, $Ca_3Fe_2Ti_{1.42}Si_{1.58}O_{12}$, $Ca_3FeTiSi_3O_{12}$, $Ca_3[Mn(OH)_6]_2$, $CaMnO_{2.98}$, $Fe_2O_3$.

Figure 11A:
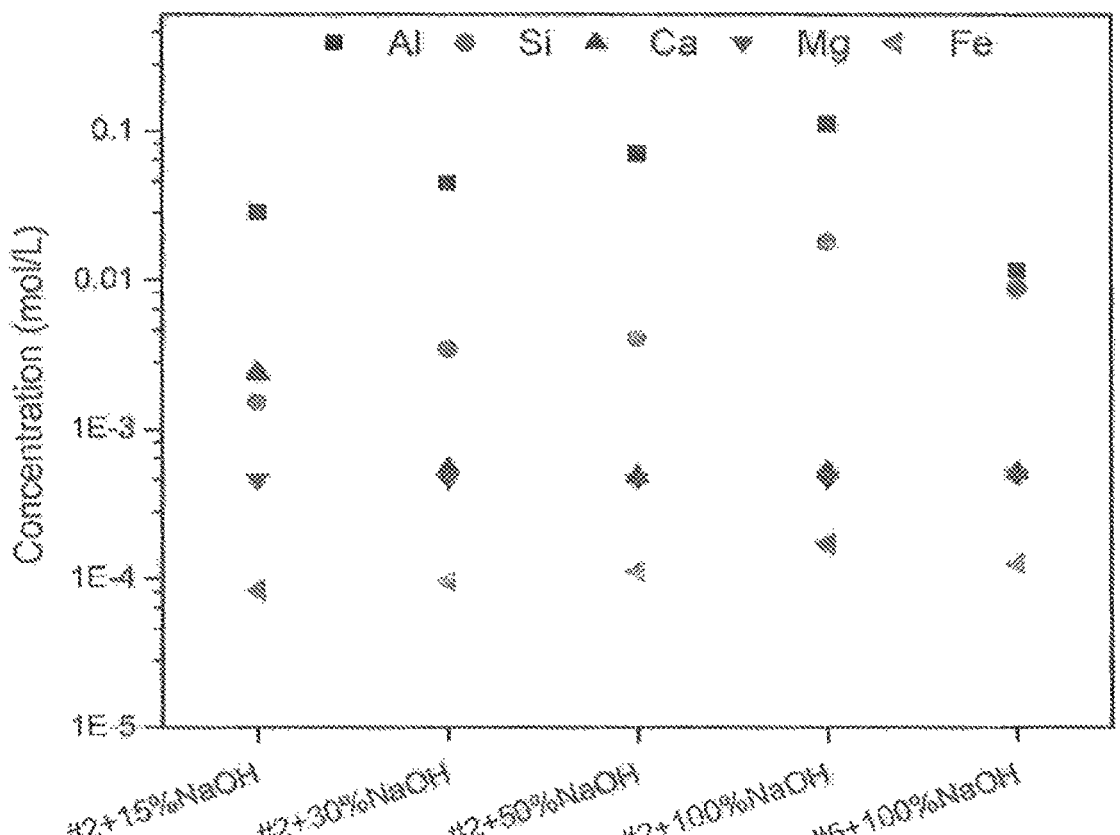
FIGS. 11A-11B are charts of measured ion concentration in alkaline filtrate resulting from some embodiments of the system shown in FIG. 1 and the method shown in FIG. 2.
Figure 11B:
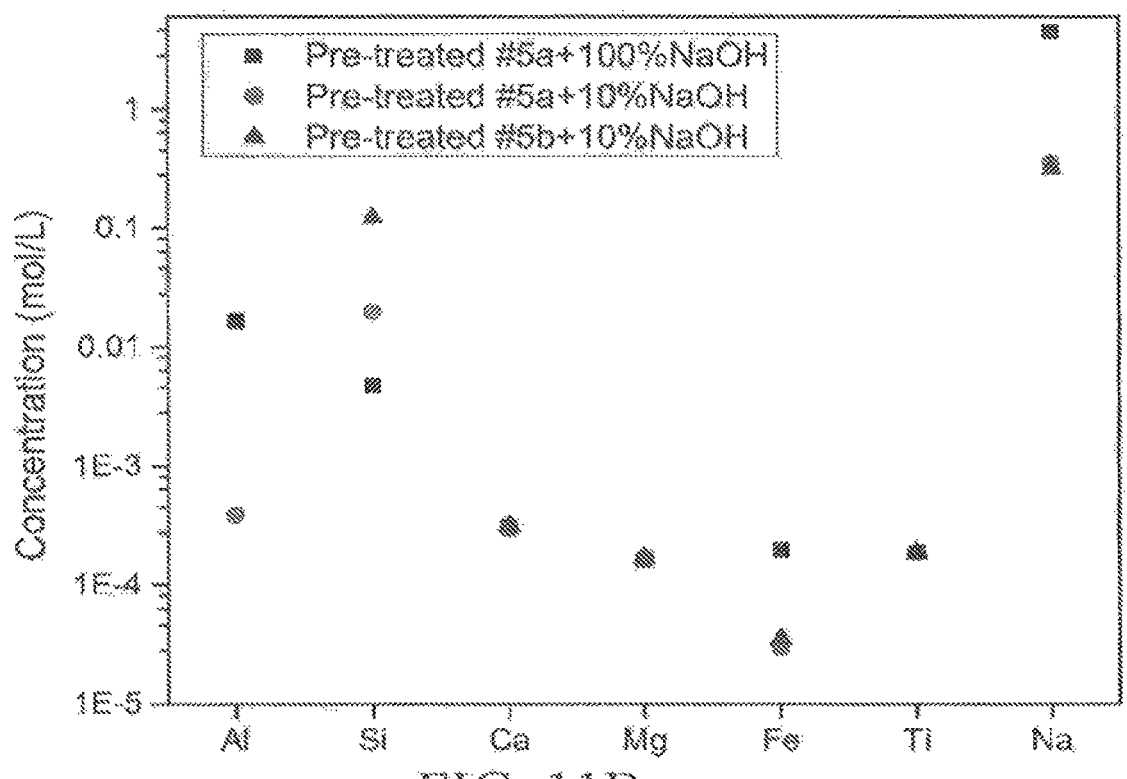
Figure 12A:
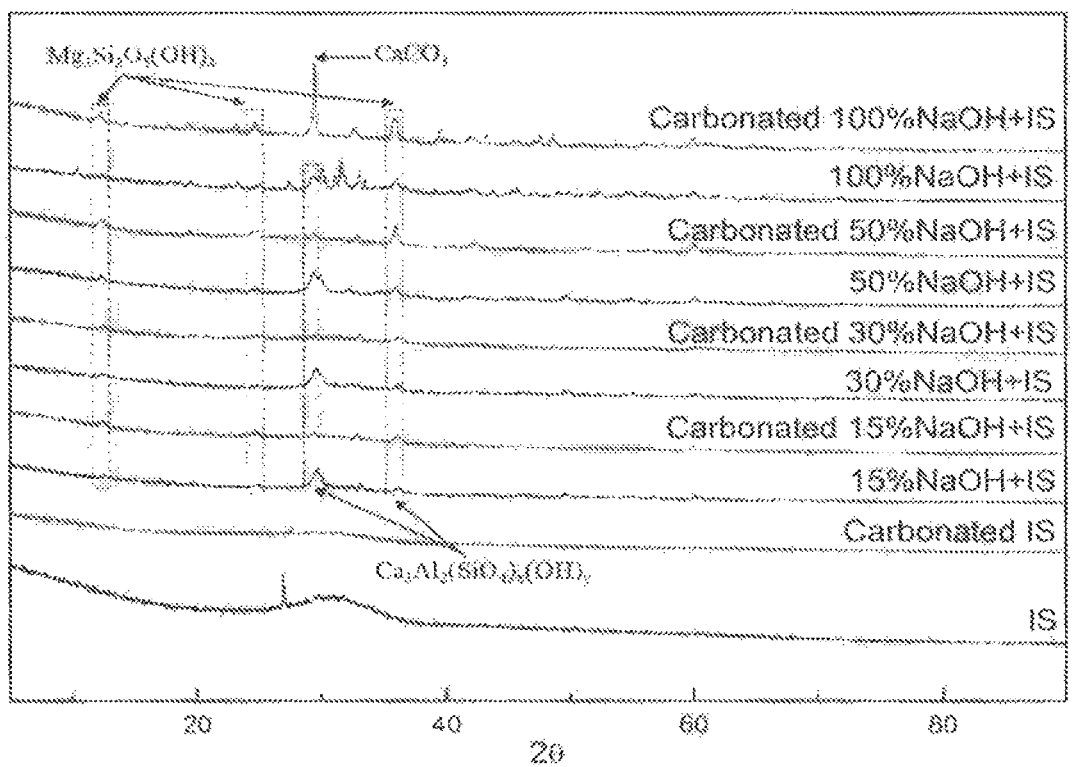
FIGS. 12A-12B are charts of x-ray diffraction (XRD) profiles resulting from some embodiments of the system shown in FIG. 1 and the method shown in FIG. 2.
Figure 12B:
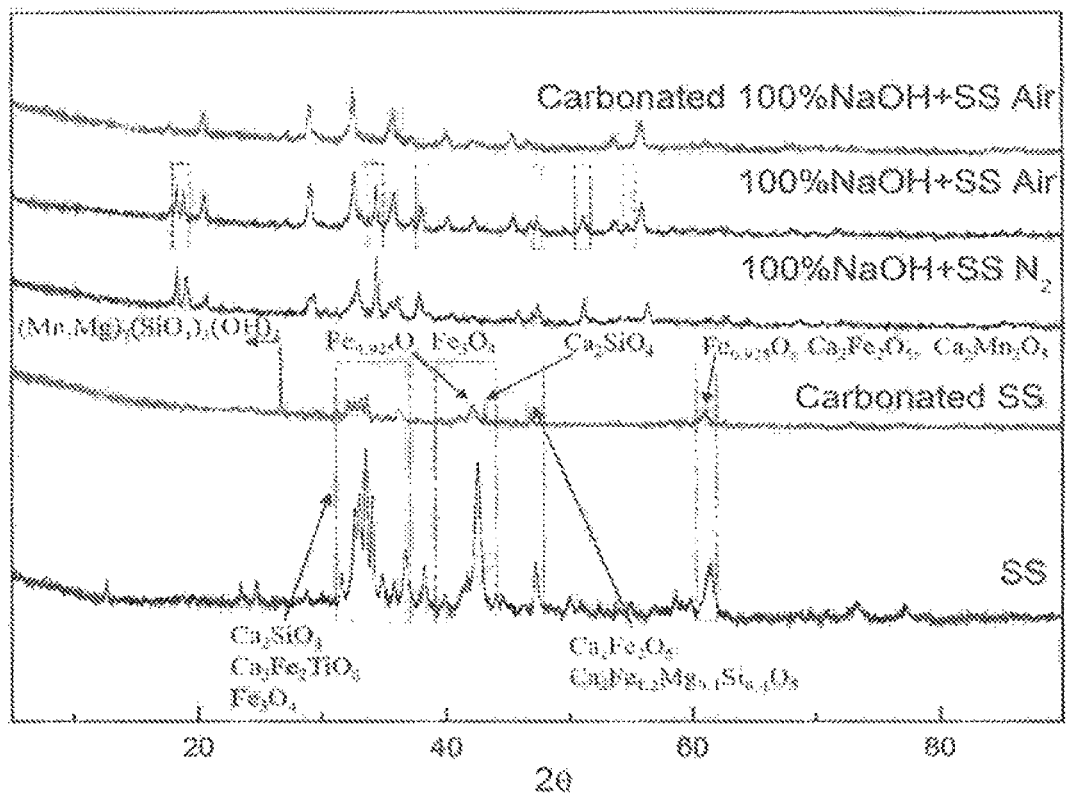

FIGS. 11A and B show the ion concentration in the alkaline filtrate: (a) #2 is Fe-lean slag and (b) #5 is Fe-rich slag. FIG. 11B shows the XRD profile of the reformed slag before and after $CO_2$ bubbling: (11A) #2, IS or Fe-lean slag and (11B) #5, SS or Fe-rich slag. FIGS. 12A and 12B) show XRD profiles of the reformed slag before and after $CO_2$ bubbling: (12A) #2, IS or Fe-lean slag and (12B) #5, SS or Fe-rich slag.

Methods and systems according to the present disclosure reduce the industrial solid waste by converting them into value-added industrial materials, which will also minimize the land use for stockpiling or landfilling these wastes and protect the ground water underneath. Methods and systems according to the present disclosure additionally reduce the carbon emission of the iron and steel plant by chemically bonding effluent $CO_2$ with Ca/Mg components extracted from slag. Overall, the solid and gaseous emissions of an energy-intensive and highly polluted industrial process have been largely reduced, recycled and valorized in order to achieve a near zero-emission goal. Therefore, the clean development and sustainability of the iron and steel industry is greatly improved.

Methods and system according to the present disclosure address the cost challenges of slag utilization, in particular carbonation of minerals and industrial wastes, attributed to lower material reactivity and consumption of acid/base in large quantities. This advantage is realized at least via physical and chemical pretreatment and alkaline reforming. As discussed above, pre-treatment of slag at least via activation of reforming results in enhanced reaction kinetics and increased percentage and efficiency of slag conversion.

Methods and systems according to the present disclosure are applicable for other similar industrial waste management such as fly ash or kiln waste, which have similar chemical compositions and high alkalinity. It also targets for the minerals in the long term therefore $CO_2$ could be securely stored via mineral carbonation.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A method of recovering products from a slag generated from an iron or steel making process comprising the following steps:
   1) collecting an amount of the slag generated from the iron or steel making process;
   2) isolating a non-magnetic-material-enriched portion from the slag by fracturing the slag into particles comprising a magnetic material and a non-magnetic material, and
   applying a magnetic separation force to the slag particles to produce a magnetic-material enriched portion and the non-magnetic-material enriched portion;
   3) collecting a leachate from the non-magnetic-material-enriched portion comprising metal oxides, metal carbonates, metal silicates, and rare-earth elements;
   4) precipitating at least one of the metal oxides and the metal carbonates from the leachate; and
   5) collecting waste water and rare-earth elements from the leachate.

2. The method according to claim 1, wherein step 3 comprises:
   separating the leachate and a slag residue.

3. The method according to claim 2, wherein step 3 comprises:
   washing the non-magnetic-material enriched portion with water, saline, or waste acids to produce a washed slurry having a basic pH; and
   dissolving the washed slurry of the non-magnetic-material enriched portion in a solution comprising an acid and a chelating agent to produce the leachate and the slag residue.

4. The method according to claim 2, step 3 further comprises dissolving the slag residue in NaOH in a conversion reactor to produce water glass and a residue comprising the metal silicates.

5. The method according to claim 4, step 3 further comprises:
   cooling the slag; recovering the heat from the slag in the form of steam; and
   feeding the steam to the conversion reactor.

6. The method according to claim 3, wherein the step of washing the non-magnetic-material enriched portion with the water, the saline, or the waste acids further comprises:
   bubbling $CO_2$ through the washed slurry;
   collecting a filtrate from the washed slurry;
   heating the filtrate to approximately 80° C.; and
   precipitating at least one metal carbonate.

7. The method according to claim 3, wherein the step of washing the non-magnetic-material enriched portion with the water, the saline, or the waste acids further comprises:
   collecting a filtrate from the washed slurry;
   providing a metal hydroxide solution;
   bubbling $CO_2$ through the metal hydroxide solution;
   collecting precipitated product; and
   recycling a remaining fluid for use in the washing of the non-magnetic-material enriched portion.

8. The method according to claim 3, wherein the acid is approximately 0.1M HCL or $HNO_3$.

9. The method according to claim 3, wherein the chelating agent is an approximately 0.01M solution selected from the group consisting of: sodium acetate, oxalate, citrate, picolinate, gluconate, glutamate, and combinations thereof.

10. The method according to claim 3, step 3 further comprises maintaining the non-magnetic-material-enriched portion at approximately 15% by weight of the non-magnetic-material during at least one of:
    washing the non-magnetic-material enriched portion with the water to produce the washed slurry having the basic pH; and
    dissolving the washed slurry of the non-magnetic-material enriched portion in the solution comprising the acid and the chelating agent.

11. The method according to claim 1,
    wherein the particles has a diameter less than 200 μm and an average diameter of in a range of 20-25 μm.

12. The method according to claim 1, wherein step 4 comprises a pH swing process.

13. The method according to claim 1, further comprising electrolyzing the leachate waste water to produce HCl and NaOH.

14. The method according to claim 1, wherein the magnetic separation force is provided by a magnetically assisted fluidized bed.

15. The method according to claim 1, further comprising desulfonating a flue gas stream utilizing the non-magnetic-material-enriched portion prior to step 2.

* * * * *